United States Patent [19]

Acker

[11] 3,800,228

[45] Mar. 26, 1974

[54] PHASE JITTER COMPENSATOR

[75] Inventor: William F. Acker, Seminole, Fla.

[73] Assignee: Honeywell Information Systems Inc., Waltham, Mass.

[22] Filed: Feb. 23, 1972

[21] Appl. No.: 228,551

[52] U.S. Cl. .................... 325/323, 325/42, 325/65, 325/331

[51] Int. Cl. .................... H04b 1/10

[58] Field of Search ........ 325/321, 42, 65, 323, 331

[56] References Cited

UNITED STATES PATENTS

| | | | |
|---|---|---|---|
| 3,701,948 | 10/1972 | McAuliffe | 325/42 |
| 3,667,050 | 5/1972 | Gibson | 325/323 |
| 3,644,830 | 2/1972 | Ragsdale | 325/42 |
| 3,701,023 | 10/1972 | Faing | 325/329 |
| 3,675,131 | 7/1972 | Pickholtz | 325/329 |
| 3,643,165 | 2/1972 | Kuribayashi | 325/329 |

*Primary Examiner*—Felix D. Gruber
*Assistant Examiner*—R. Stephen Dildine, Jr.
*Attorney, Agent, or Firm*—Nicholas Prasinos; Ronald T. Reiling

[57] ABSTRACT

An automated REAL Time Equalized Modem (ARTEM) having a phase jitter compensator. Because a delay is involved in estimating a proper phase for demodulation, the data signals are delayed so that their delay is equal to the carrier phase estimation delay at the point where the final carrier phase correction is applied.

26 Claims, 15 Drawing Figures

PHASE JITTER COMPENSATOR

BACKGROUND OF THE INVENTION

1. Field of the Invention

This invention relates in general to modems and particularly to Automatic Real-Time Equalized Modems (ARTEM) and more specifically to an apparatus and method for continuously monitoring and compensating for the time variant HF media, telephone channels and localized subsystems.

2. Description of the Prior Art

In high speed data transmission over a nominal 3kHz channel several time-variant factors affect the reliability of data transmission and its recovery.

In a book entitled *Principles of Data Communication* by R. W. Lucky, J. Salz and E. T. Welden, Jr., published by McGraw-Hill Book Company in 1968 the authors detail a variety of problems in designing efficient transmitters and receivers. On page 12 of the above subject book the authors state:

"A number of causes other than noise and linear distortion can result in the output of a channel being different from the input... Among the miscellaneous impairments and nonlinearities, frequency offset, and phase jitter [incidental frequency modulation (FM)].

"Nonlinearities are always present in a communications system to some small extent because of the impossibility of achieving truly linear amplification or filtering. These types of non-linearities are largely negligible, but occasionally significant effects result when amplifiers are overloaded into operation in a highly nonlinear region. Significant nonlinearities also occur on the switched telephone networks owing to the action of voice companders (circuits designed to compress and later expand the dynamic range of speech signals).

"Frequency offset and phase jitter are other phenomena associated with telephone transmission. Both effects result from the use of a carrier system within the telephone channel. The voice frequency band, nominally 0 to 3kHz, is heterodyned or shifted in frequency to higher frequencies and then multiplexed with other voiceband signals to form a portion of a wideband signal.

At a distant point this signal is demultiplexed and the original voice channels are separated. In heterodyning the voiceband back to baseband, the reference carrier may differ in frequency and phase from the modulating carrier. Thus at the receiver the voice band lies between *l* to 3kHz, where *l* is a frequency shift of typically a few cycles. This frequency offset makes the telephone channel technically a time-varying system since the response to an applied impulse is a function of the time at which the impulse was applied. However, the offset is unimportant from a theoretical point of view since it represents a simple and constant transformation of the transmitted wave. In practice it can be simply removed at the receiver.

"In addition to the frequency offset the instability of the modulating and demodulating-carrier generators causes a random jitter (underlining added) in the phase of the received signal. This jitter is equivalent to a low-index, random-frequency modulation of the transmitted signal and is consequently termed incidental FM. The severity of the incidental FM depends in large part upon the kind of carrier system used on a particular connection."

The phase jitter problem is further detailed by Philip F. Panter, in his book entitled *Modulation, Noise and Spectral Analysis*, published in 1965 by McGraw-Hill Book Company, and on pages 211–213 the author presents an apparatus for eliminating both phase and frequency errors in the received local oscillator. Basically his system provides for splitting the local oscillator signal into two quadrature components which then feed separate product detectors. "The filtered outputs of these two product detectors are then in turn multiplied together to produce an output signal which is proportional to local oscillator phase error. If the local oscillator is properly synchronized to the phase of the incoming signal, the upper low-pass filter will contain the desired modulation voltage $g(t)$ while the lower low-pass filter output will be zero, due to the quadrature relationship of the corresponding local oscillator signal and the incoming DSB signal. Under these conditions, multiplication of the two low-pass filter outputs will yield no control signal. If we now assume a small error in the phase of the local oscillator signal, the output voltage from the upper low-pass filter will be reduced somewhat in amplitude, but otherwise no change in this voltage will take place. The output of the low-pass filter will now show some signal voltage $g(t)$, and this voltage will be either in phase with the signal voltage from the upper filter or in exact phase opposition to the upper-filter output voltage, depending upon the sign of the phase error. Thus a d-c voltage will be produced at the output of the first multiplier following the low-pass filter, whose polarity will depend, at least for small phase errors, upon the magnitude of this phase error. This control voltage may be used to adjust the local oscillator signal and thereby to remove the phase error."

As the author has stated and is also generally known this system may be effective for small low frequency phase errors such as may be generally encountered in voice modulation or slower rates of data transmission, but it does not appear to be effective for larger higher frequency phase errors and the problem of phase jitter was one of the major deterrents in obtaining reliable high speed (19.2 kilobits per second) data transmission over a communication channel.

In essence prior art techniques tried to correct for phase jitter by applying corrections obtained from past history or what the phase was a little while ago, and the correction was made for what the jitter was at some time prior to the time the correction was actually applied. Because of delays encountered in filters during the band pass or low-pass filtering processes what is actually needed from a practical standpoint is to take into account the delays in the phase estimation and and in the data circuits at the point where the phase jitter correction is actually applied.

SUMMARY OF THE INVENTION

Briefly the invention herein disclosed comprises means for taking into account the delay involved in estimating a proper phase for demodulation. The instant invention delays the data signals and baud timing signals so that their delay is equal to the carrier phase estimation delay at the point where the final carrier phase correction is applied.

OBJECTS

It is an object, therefore, of the instant invention to provide an improved apparatus and method for phase jitter correction.

It is a further object of the invention to provide for reliable high speed data transmission over a nominal communication channel.

It is still a further object of the instant invention for correcting phase jitter by providing an apparatus and a method which takes into account the delay involved in estimating a proper phase for demodulation.

Other objects and advantages of the invention will become apparent from the following description of the preferred embodiment of the invention when read in conjunction with the drawings contained herewith.

BRIEF DESCRIPTION OF THE PREFERRED EMBODIMENTS

GENERAL

ARTEM is basically a high speed HF modem system which employs PAM-VSB (pulse amplitude modulated-vestigial side band) transmission and an adaptive receiver which continuously monitors and compensates for the time varient HF media. Employing approximately 2,700Hz of bandwidth the transmitter operates at a symbol rate of 4,800 symbols per second.

THE CHANNEL

Figure 1:
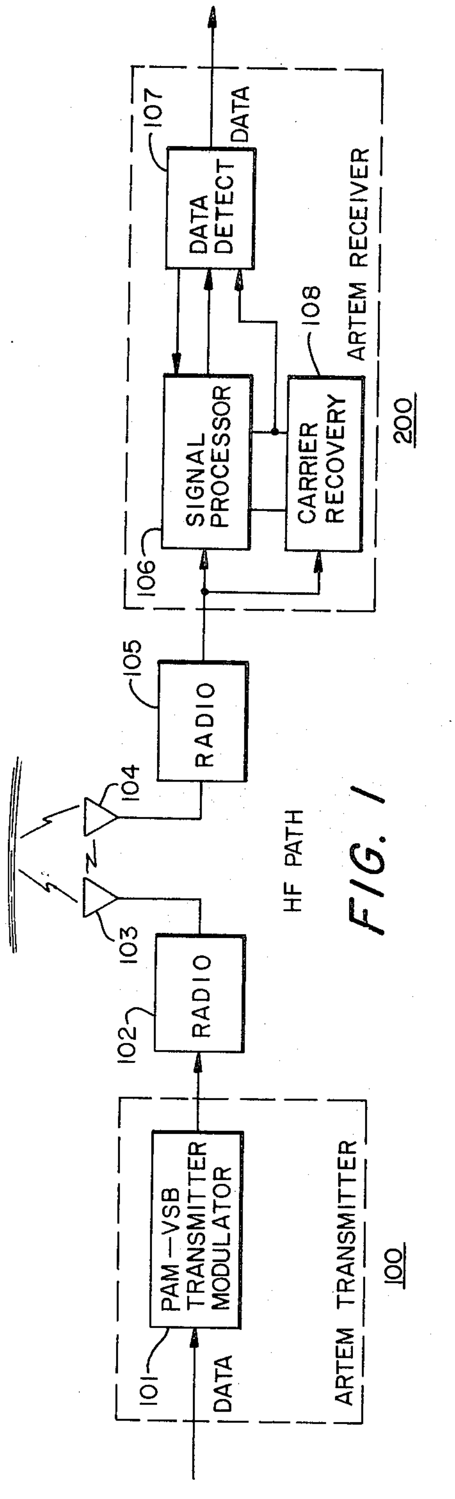
FIG. 1 is a block diagram of an ARTEM transmitter-receiver basic channel.

A basic channel of the ARTEM system is shown in FIG. 1 in block diagram form. The channel is composed of the VSB-HF (vestigial sideband high frequency) radios 102, 105 and the physical HF medium. The HF channel may be modeled in baseband as the parallel connection of two or more paths each of which may be described in terms of several time varying parameters. Specifically, the parameters for each of these paths are doppler shift, path time delay, and path gain. If the transmission range is less than 2,000 miles, normally only two distinct paths are present. The two path model contains essentially four major time variable parameters. First, each path contains a common doppler shift Δ Ft which is caused by a relative movement between the radio transmitting and receiving antennas. This doppler shift can be as large as ±75Hz in an aircraft-to-ship transmission if the transmitter is contained in MACH 3 aircraft and operating at a frequency of 25MHz.

Second, an absolute time delay $T_t$ is common to all paths and the rate of change of the time delay is in the order of $3 \times 10^{-6}$ seconds per second if the distance between transmitter and receiver is changing at a rate of MACH 3 and is generally negligible. Third, a single gain variable $G_t$ describes the relative path strengths of the two paths where one path is assigned a value of unity. Typical values of $G_t$ are +½ and −½ while the rate of change of $G_t$ is in the range of 0.2 to 3Hz. Finally a differential time delay $\Delta \tau$ ranges from 0 to 4 milliseconds.

Transmitter

Figure 2:
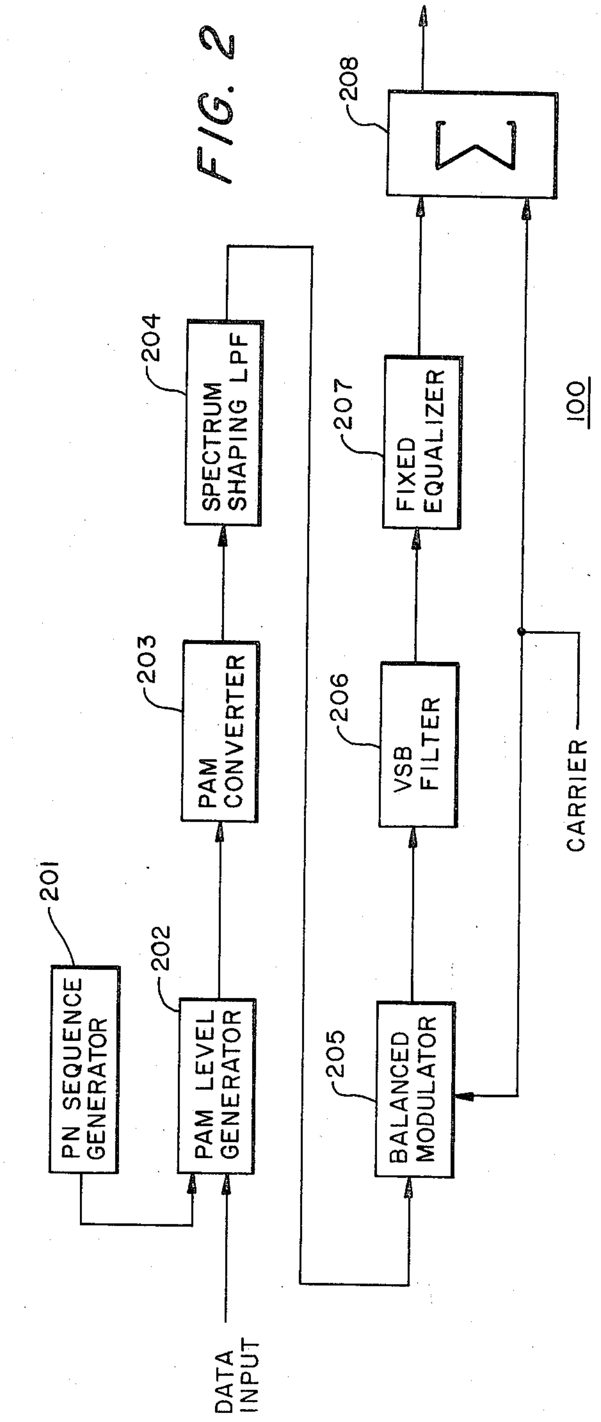
FIG. 2 is a more detailed block diagram of the ARTEM transmitter or modulator.

Referring to FIG. 2 there is shown the basic conventional ARTEM transmitter 100. The ARTEM transmitter or modulator 100 employs four or eight level, PAM-VSB modulation. This type of modulation scheme is widely used in high data rate wireline modems as it is relatively simple and very efficient with respect to required bandwidth. If four level PAM is transmitted, one bit of data and one bit of a known PN (Pseudo Noise) sequence are encoded into one of the four PAM levels while if eight level PAM is transmitted, two data bits and one PN bit are encoded into one of the eight levels. Since the PN sequence is known at the receiver, it is used to provide channel characteristic information. In 2,400Hz of bandwidth (for example) a symbol rate of 4,800 symbols per second may be achieved. Four level PAM then provides a data rate of 4,800 bits while eight level PAM yields 9,600 bits.

Referring again to FIG. 2 a sequence generator 201 outputs a known, repetitive sequence of 63 bits, although other quantities may be used. The sequence generator is further comprised of a 6-bit shift register whose taps are set according to the algorithm:

$$x_{t+7} = x_{t+1} + x_{t+6}$$

Each stage of the register stores one binary digit which is serially transferred from left to right at the clock rate.

The PAM level converter 203 encodes one PN bit, $P_k$, and one or more data bits, $d_k$, into a PAM level $a_k$. If four-level signalling is employed, the encoding relation is:

$$a_k = (2/3/p_k + (1/3)d_k$$

If signalling is eight level, two data bits, $d_k$ and $d'_k$, and one PN bit are converted into a level according to the equation:

$$a_k = [(4/7)p_k + (2/7)d_k + (1/7)d'_k].$$

The PAM converter 203 produces a series of impulses whose weights are determined by the value of the levels $a_k$. These pulses are then passed through the spectrum shaping LPF (low pass filter) 204 whose impulse response is a causal approximation to sin (at)-/(at). After processing by the balanced modulator 205 the signal spectrum occupies a frequency band from 500Hz to 5,500 Hz.

The VSB (vestigial side band) filter 206 reduces the energy above the 3,000Hz carrier, and finally the VSB signal is passed through a fixed equalizer 207 which partially compensates for fixed channel distortions which may be attributed to radio transfer characteristics, etc.

As mentioned supra the ARTEM modulator utilizes PAM-VSB modulation although the invention may be utilized with other modulation schemes as SSB (single side band) or DSB (double side band). VSB transmission is actually a compromise between DSB which is wasteful of bandwidth and SSB which is difficult to mechanize due to filter requirements and carrier recovery problems. VSB requires only slightly more bandwidth than SSB while requiring simpler filters and providing a residual carrier which may be recovered for the purposes of demodulation and phase correction.

Figure 3:
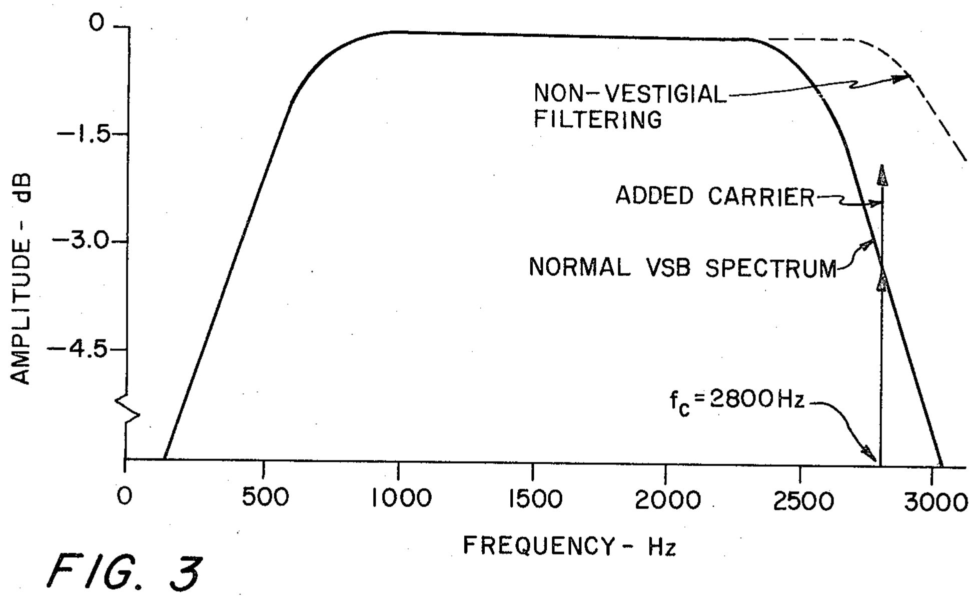
FIG. 3 is a graph of a typical amplitude vs frequency spectrum of the ARTEM system.

In order to track carrier frequency (to be described infra) and assist in carrier phase jitter recovery the normal VSB spectrum is modified by inserting carrier frequency power and permitting the transmitted spectrum to be approximately DSB in the vicinity of the carrier. (See FIG. 3). The summer 208 of FIG. 2 adds the carrier to the output signal.

ARTEM Receiver

Figure 4:
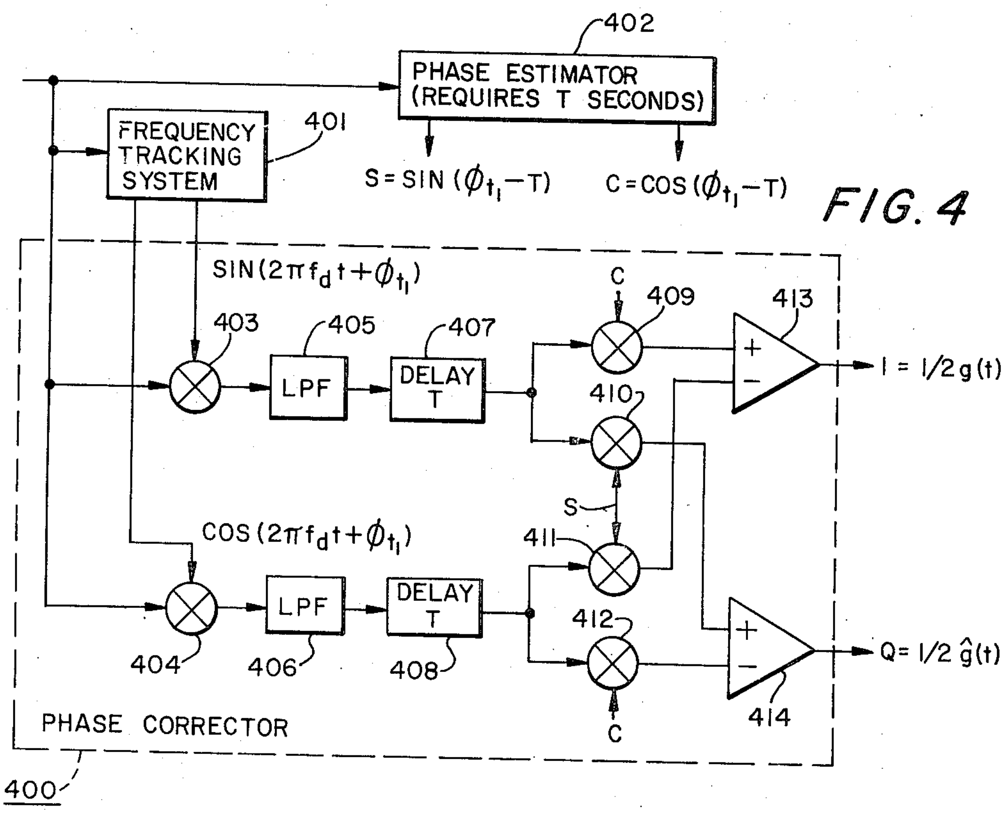
FIG. 4 is a block diagram of the carrier recovery subsystem showing details of the supplemental phase corrector.

As shown in FIG. 1 the ARTEM receiver 200 is comprised of a signal processor 106, data detector 107, and carrier recovery 108. Most pertinent to the instant invention is the carrier recovery subsystem which although shown as a separate block is essentially an integrated subsystem forming a part of the ARTEM receiver. Essentially the function of the carrier recovery subsystem shown in greater detail on FIG. 4 is to demodulate the VSB signal to baseband with a "best" carrier frequency estimate and, in addition, to provide a supplemental carrier phase correction.

Figure 5:
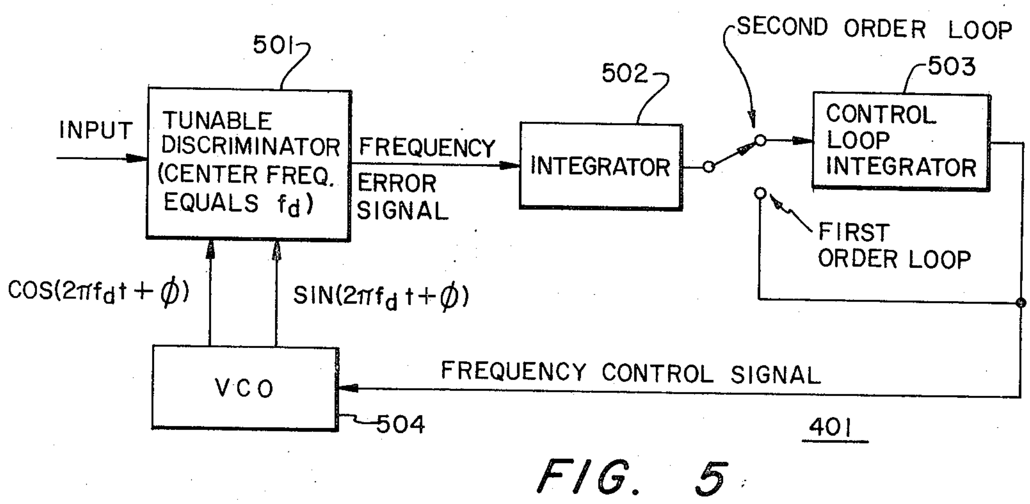
FIG. 5 is a block diagram showing details of the frequency tracking system.

The carrier recovery system may be partitioned (for ease of explanation) into three major functional subassemblies which comprise the phase corrector 400, the frequency tracking system 401, and the phase estimator 402. In contrast to a normal phaselock loop which typically tracks, or is affected by, both frequency and phase, the system of FIG. 4 divorces the operations of tracking frequency and tracking phase. Estimation of a "best" carrier frequency is the first function of the carrier recovery system. As shown in greater detail on FIG. 5 this is accomplished by the frequency tracking system which operates as either a first or second order frequency locked loop. It is important to note that as a frequency locked loop this system does not attempt to track, nor is it affected by the phase of the incoming carrier(s). Given an input of one or more apparent carriers, separated in frequency due to differential doppler, this system selects a carrier frequency which corresponds to the centroid of the energy of the multiple received carriers. The input then is that portion of the received spectrum in which the carriers may be expected to lie. The outputs are sine and cosine signals at a "best" estimate of the carrier frequency and at an arbitrary phase.

Input to the carrier frequency tracking system is supplied directly to a tunable discriminator 501 whose center frequency is determined by the VCO (voltage controlled oscillator) 504 output. If the discriminator center frequency does not correspond to the centroid of the incoming carrier energy, an error signal is fed to one or two integrators 502 and 503, which in turn feed the VCO 504. The loop is first or second order depending upon whether one or two integrators are included in the loop. In the first order mode, if a selective fade removes the incoming carrier energy, the loop frequency remains fixed until the carrier energy reappears. However, in the second order mode, if a fade were to occur when the loop was tracking a rate of change in carrier frequency of, for example, 2Hz per second, the loop would continue to shift frequency at a rate of 2Hz per second until the carrier energy reappeared. In a sense, the second order loop uses past history to predict the proper carrier frequency during a frequency selective fade.

The sine and cosine of the estimated "best" carrier frequency are used to demodulate the input signal. Subsequent to this quadrature demodulation the two resultant baseband signals are passed through a carrier phase compensation system shown in FIG. 4, which is comprised of a phase estimator 402 and a phase corrector 400.

The theory behind the phase corrector is as follows. At any given time there exists an optimum phase for demodulating the VSB signal. However, since this phase is not known, nor may it be instantaneously computed, the passband waveform is demodulated by quadrature carriers at an arbitrary phase angle. all the information in the original signal can be shown to be preserved in the two quadrature waveforms, and these quadrature waveforms are stored in the two delay lines. At a later time the proper phase is computed by the phase estimator 402. The signal is delayed T seconds as the phase estimator 402 requires this amount of time for estimating the proper phase. Given the phase correction, the delayed quadrature signals are then subjected to a transformation which corrects for any phase error introduced by previously demodulating the signal at an arbitrary phase.

Mathematically the phase corrector operation is straightforward. Suppose the VSB signal as represented by:

$s(t) = g(t) \sin (2\pi f_d t) + \hat{g}(t) \cos (2\pi f_d t)$ where $g(t)$ = the desired baseband signal $\hat{g}(t)$ = the Hilbert transform of $g(t)$ $fd$ = the carrier frequency $t$ = time is demodulated by demodulator 403 by the function sin $(2\pi f_d t + \phi)$ yielding $I'(t)$.

where $\phi$ = the phase error of the demodulator $I'(t)$ = the in-phase demodulator output.

It may be shown by trigonomertric identities that $I'(t)$ is given by $$I'(t) = s(t) \cdot \sin (2\pi f_d t + \phi)$$
$$= g(t) \cdot ½\cos \phi - g(t) \cdot ½ \cos (4\pi f_d t + \phi) + \hat{g}(t) \cdot ½\sin \phi + \hat{g}(t) \cdot ½ \sin (4\pi f_d t + \phi).$$

After low pass filtering through LPF 405, and delayed by time T at delay line 407, the resultant $\hat{I}(t')$ is:

$$\hat{I}(t') = ½g(t') \cos \phi + ½\hat{g}(t') \sin \phi$$

where $t'$ = the delayed time reference $\hat{I}(t')$ = the delayed, jitter corrupted, in-phase signal.

In similar fashion, let $g(t)$ be demodulated by demodulator 204 by the quadrature reference cos $(2\pi f_d t + \phi)$ and low pass filtered by LPF 406 and delayed by a time T at delay line 408 to yield $\hat{Q}(t')$ where $\hat{Q}(t')$ = the delayed, jitter corrupted, quadrature signal.

It may be shown that:

$\hat{Q}(t')$ is given by $$\hat{Q}(t') = -½\ g(t') \sin \phi + ½\ \hat{g}(t') \cos \phi.$$

The above $\hat{I}(t')$ and $\hat{Q}(t')$ are the specific signals which were demodulated at the improper phase angle $\phi$ and stored in the delay lines. At a later time, cos $\phi$ and sin $\phi$ are computed. The desired component $g(t)$ may then be obtained by the following transformation of coordinates or matrix multiplication:

$$\begin{bmatrix} \cos\phi - \sin\phi \\ \sin\phi + \cos\phi \end{bmatrix} \begin{bmatrix} \hat{I}(t') \\ \hat{Q}(t') \end{bmatrix} = \begin{bmatrix} \frac{1}{2}g(t') \\ \frac{1}{2}\hat{g}(t') \end{bmatrix} \quad (14\text{–}1)$$

The $\hat{g}(t')$ term is not necessarily used or computed.

Thus, the phase corrector is able to compensate for a phase error occurring in the demodulation process. The above matrix multiplication is performed by the four multipliers 409, 410, 411, and 412 of FIG. 4, and the addition is performed by the two summers 413 and 414 of FIG. 4.

In the above discussion, it was assumed that a subsystem 402 of FIG. 4 existed which was capable of estimating the proper carrier phase after a delay of T seconds. Details of this subsystem are shown in FIG. 6.

Figure 6:
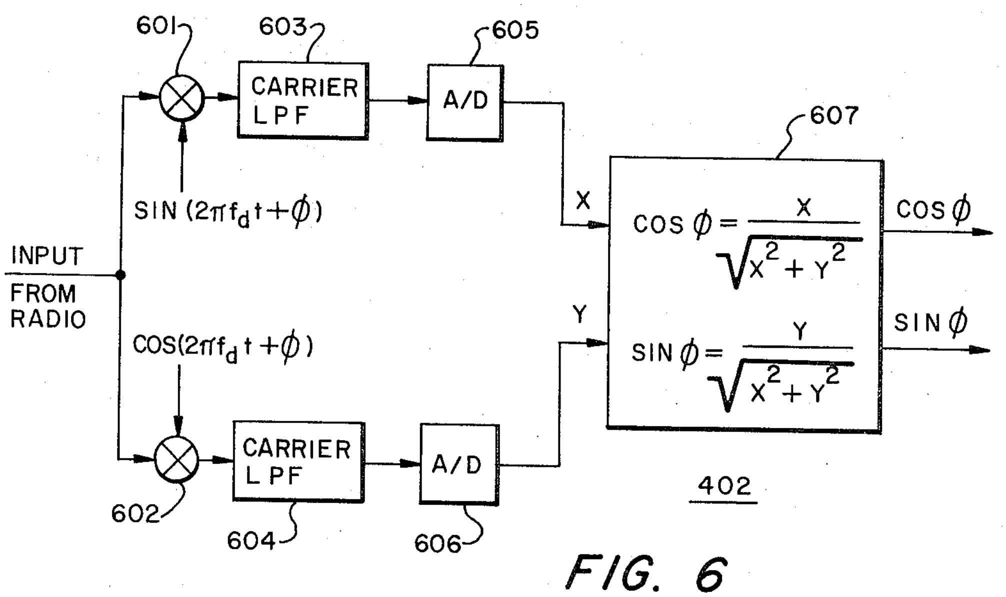
FIG. 6 is a block diagram showing details of the phase estimator for estimating proper carrier phase.

Referring to FIG. 6 operation of the carrier phase estimator may be readily explained by recalling the fact (supra) that in a small region about the carrier VSB spectrum appears to be double sideband. Thus, in a small region centered about the carrier, sin $(2\pi f_d t)$, the pass band signal $m(t)$ may be described as:

$$m(t) = (k + g(t)) \sin (2\pi f_d t)$$

$k$ = additional carrier power due to insertion of a carrier beacon in the transmitter
$t$ = time
$g(t)$ = baseband data signal
$f(t)$ = carrier frequency.

Suppose $m(t)$ is demodulated by quadrature demodulators 601 and 602, at a phase error angle $\phi$ and the carrier is low pass filtered through LPF's 603 and 604, yielding the quadrature components $X$ and $Y$ given by:

$$X(t) = ½ [k + g(t)] \cos \phi \quad (15\text{–}1)$$

$$Y(t) = ½ [k + g(t)] \sin \phi \quad (15\text{–}2)$$

where $X(t)$ = recovered in-phase carrier beacon
$Y(t)$ = recovered quadrature carrier beacon.

The sine and cosine of the demodulation phase error $\phi$ may then be obtained according to the relation:

$$\cos \phi = X/ \sqrt{X^2 + Y^2}$$
$$\sin \phi\ Y/ \sqrt{X^2 + Y^2}$$

One way of computing the above values is to use a general purpose digital computer such as the Honeywell 6000.

For example, it can be demonstrated that if the low pass filters employed in the phase estimator 402 are 10Hz, a delay of approximately $T$=20 milliseconds is encountered from the time the incorrect phase was used for demodulation until the time $\phi$ could be estimated by the circuit above. Thus, a $T$-second delay is needed in the demodulated signal before the correction may be applied.

DETAILED DESCRIPTION AND OPERATION OF THE PREFERRED EMBODIMENT

It was mentioned supra that in the ARTEM carrier recovery system, it is advantageous to separate the carrier frequency tracking process from the carrier phase tracking process. The reason for this is that when the recovered carrier beacon fades to a small amplitude the phase often varies very rapidly thus producing large short term variations in the instanteous frequency of the recovered beacon; however, when the recovered beacon regains enough amplitude to become significant, the average frequency of the recovered beacon is usually the same as it was before the fade. Therefore, the requirement for tracking carrier frequency is the ability to adjust the frequency tracking system only when the amplitude of the carrier beacon is significant and to build enough inertia into the system to enable it to extrapolate from past history during intervals when the received beacon amplitude is inadequate. Systems of this type are used for tracking the beacons of navigation satellites.

Another requirement of the frequency tracking loop is that it must have a wide enough band width to acquire carrier beacons offset by as much as ± 75 hertz from the nominal frequency and yet have a narrow bandwidth in the sense that the averaging time used for measuring carrier frequency must be fairly long (for example, 100 milliseconds) in order to average out the short term effects of noise fading and data.

Figure 7:
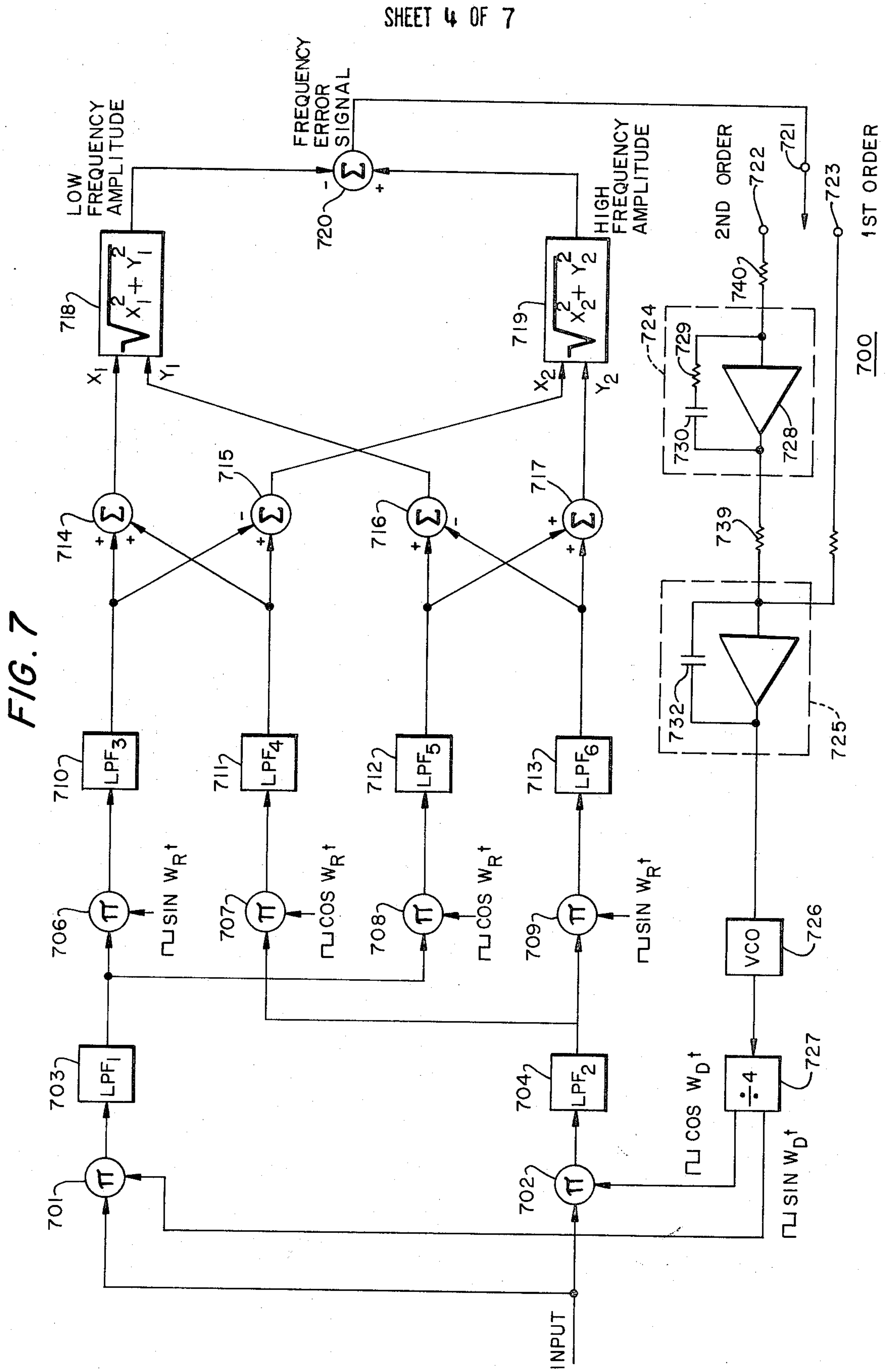
FIG. 7 is a detailed block diagram of the centroid frequency tracking system.

It is not feasible to build a phase lock loop which satisfies the above requirements; however, the requirements can be satisfied by using a frequency tracking system. One such system is shown in FIG. 7. The upper portion of the figure is simply a discriminator for producing the frequency error signal that is applied through one or more integrators 724 and 725 to the voltage controlled oscillator (VCO) 726 which runs at 4 times the carrier frequency. Digital logic circuits 727 divide the oscillator output by four to obtain two square waves which are at the carrier frequency and are exactly 90° apart in phase. These square waves control the demodulators 701 and 702 which demodulate the input signals to recover the carrier beacon. If low pass filters 703 and 704 have for example a 75 hertz bandwidth then input signals within 75 hertz of the demodulator drive frequency, $f_d$, will pass through these filters. The result is that these two demodulators and filters act like a band pass filter with a total band width of 150 hertz centered about the demodulator frequency, $f_d$, as shown on FIG. 9a. These two filters 703 and 704 limit the band width of the input signals permitted to reach the discriminator. The next four modulators 706, 707, 708, and 709, low pass filters 710, 711, 712, and 713 and combining network 714, 715, 716 and 717, function like band pass filters centered about $f_d - f_r$ and $f_d + f_r$ where $f_r$ is the frequency used to drive these four modulators. The four modulators shift the output of low pass filters 703 and 704 both upward and downward by $f_r$ resulting in double side band spectra. Low pass filters 710 through 713, remove harmonics of the square wave modulation process and produce a gradual attenuation of amplitude versus frequency. When the outputs of low pass filters 710 and 711 are added, one set of signal components cancel and the other set adds so that only effects centered around the frequency $f_d - f_r$ remain. When the outputs of these two filters are subtracted, the opposite sets' components cancel and add, thus, only the effects centered around $f_d + f_r$ remain.

If the input signal is a sinusoid then X and Y will be sinusoids which are equal in amplitude and 90° in phase with respect to each other. Since $sine^2 + cosine^2$ is equal to 1, the instantaneous peak amplitude can be obtained by squaring X, squaring Y, adding them, and taking the square root of the sum. Since the output does not depend upon the particular phases of X and Y, it does not vary with time and hence, no low pass filtering is required.

Figure 9A:
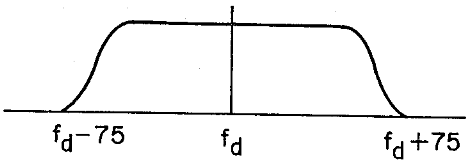
FIGS. 9A–9E are amplitude vs frequency curves of bandpass and discriminator characteristics of the invention.
Figure 9B:
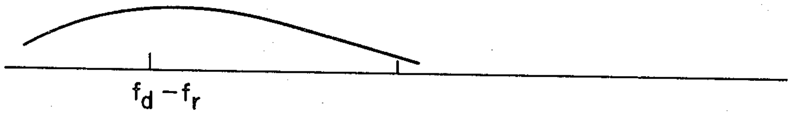
Figure 9C:
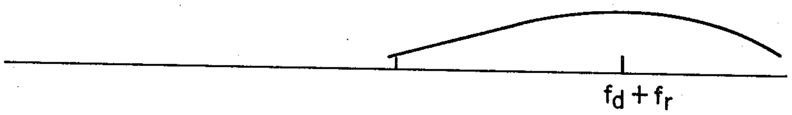
Figure 9D:
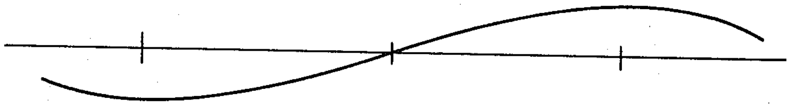
Figure 9E:
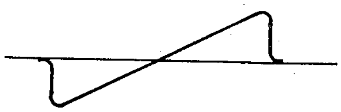

When the output of the low frequency narrow band filter is substracted from that of the high frequency narrow band filter the difference signal shown on FIG. 9D is obtained. When the band pass filter effects of low pass filters 703 and 704 are also considered, the band pass effect shown on FIG. 9A is also obtained producing the results shown on FIG. 9E. FIG. 9B shows the band pass effects (BPE) when low pass filters 710, 711, 712, and 713 act with the modulators 706, 707, 708 and 709 and their outputs are combined to form $X_1$ and $Y_1$. FIG. 9C shows the BPF effects when LPF's 710, 711, 712 and 713 act with modulators 706, 707, 708 and 709 and their outputs are combined to form $X_2$ and $Y_2$. The effect of FIG. 9C minus the effect of FIG. 9B produces the effect of FIG. 9D which gives an overall effect of a discriminator. However, a more conventional discriminator could also be used with the invention.

The averaging time of the frequency track loop can be adjusted by changing the values of the capacitors 732 and 730 and resistors 739 and 740 associated with the integrators 725 and 724 respectively which are shown at the bottom of FIG. 7. The switch 721 permits the operator to choose between a first order frequency lock loop 722 and a second order frequency lock loop 723. If the switch were in the first order mode when the carrier beacon fades away, then the frequency track system would tend to remain constant until the beacon reappeared. On the other hand, if the frequency track loop were operating in the second order mode and the carrier beacon has been ranging in frequency at a constant rate of, for example, 2 hertz per second before it disappeared, then the output of the frequency tracking loop would tend to continue changing at a rate of 2 hertz per second until the beacon reappeared. In this mode, the system would tend to track the center of mass of the received beacon spectrum rather than track any particular beacon image. Any unbalance in the beacon spectrum with respect to the demodulator drive frequency would produce an error signal out of the discriminator and thereby adjust the local VCO, 726, frequency.

By locking on the average frequency rather than on the particular tone the frequency lock loop tends to reduce the rate at which the carrier frequency tracking system changes. For example, assume the two carrier beacon signals are recovered which have approximately the same amplitude and are separated by 2 hertz in frequency. If the frequency tracking system were to lock on one of these signals the other would cause the recovered beacon to beat at a 2 hertz rate. By locking midway between these two tones the beat rate can be reduced to 1 hertz per second. This is one of the features which makes it desirable to track the centroid of the pilot one spectrum rather than track the largest single component. Another advantage of the centroid tracking approach is that when several beacons are being watched simultaneously using a fairly wide input bandwidth to the discriminator, it becomes very unlikely that a spurious pilot tone will capture the frequency lock loop and drag it far enough away from the central beacon such that the tracking loop will not be able to recover. A more conventional phaselock loop can be used in place of the above frequency lock loop depending upon the type and magnitude of the channel degradations involved.

Figure 8:
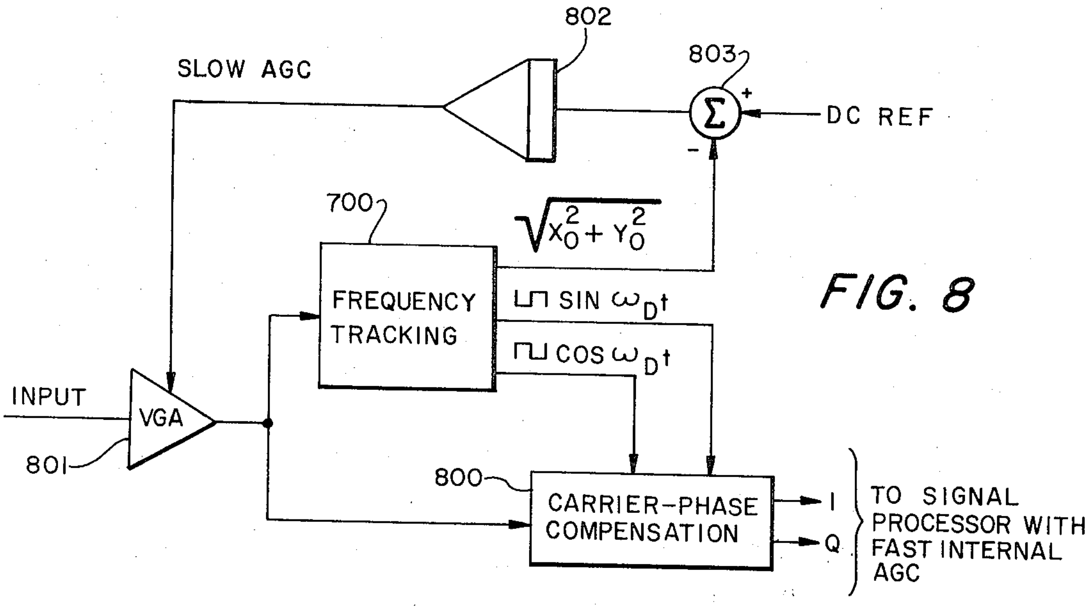
FIG. 8 is a block diagram of the carrier recovery subsystem.

The interconnections between the frequency tracking module 700 and the carrier phase compensation module 800 are shown in FIG. 8. The input signal comes from the HF receiver although other data channels can be used. The I and Q output signals go to the signal processor (not shown) which may perform an adaptive match filtering and/or real time equalization to recover the data signals or may not do any of these functions. The signal processor may also perform automatic gain control operations and carrier phase compensation operations internally. The frequency tracking module 700 furnishes demodulator drive signals to the carrier phase compensation system 800. In cases where the carrier frequency uncertainty is small the carrier tracking system may be replaced with a fixed frequency oscillator.

A frequency offset may be equated to a phase error which varies linearly with time. If the variation is slow enough, the phase compensation system will be able to detect and correct for this time varying error.

Figure 10:
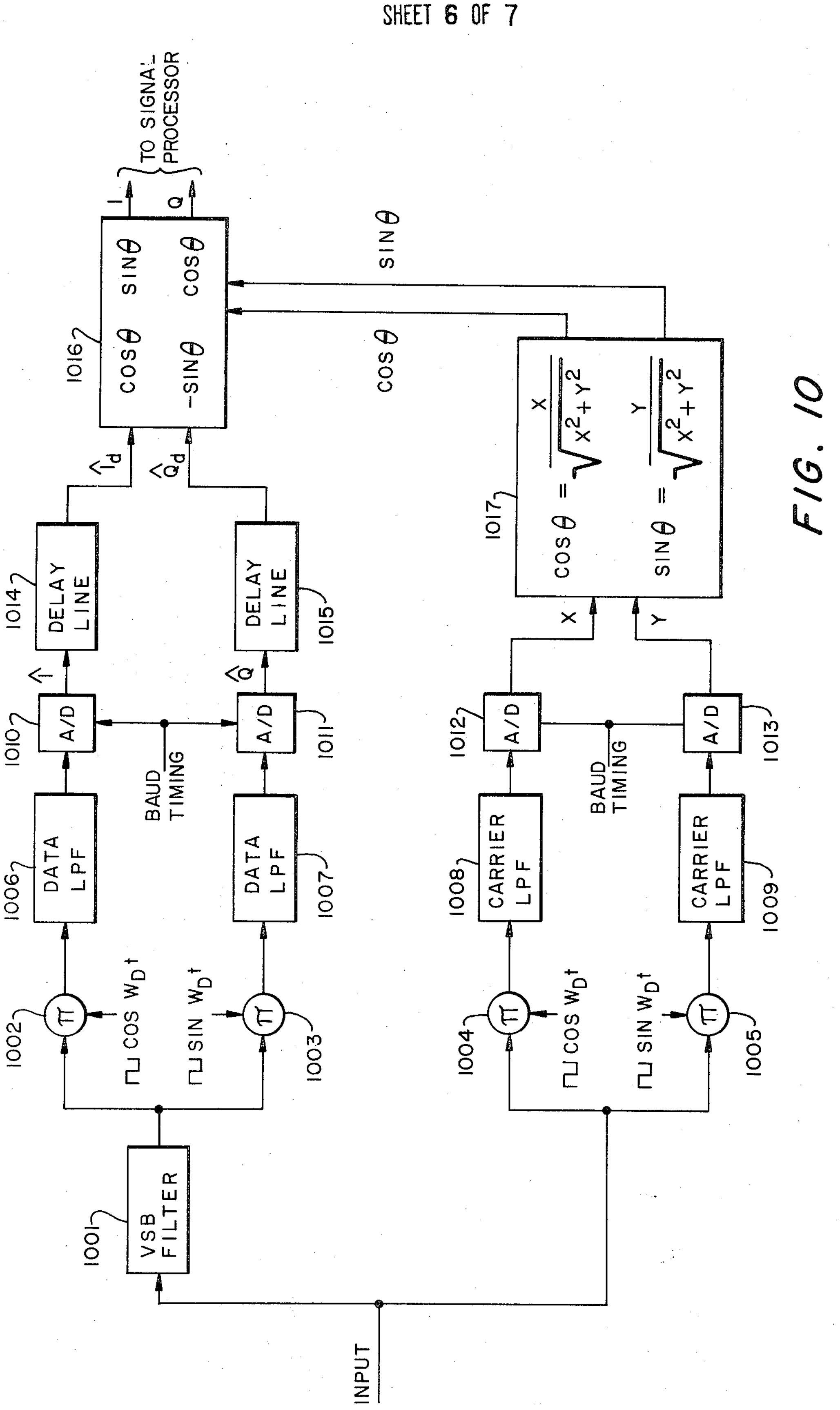
FIG. 10 is a block diagram of one embodiment of the invention.

Referring now to FIG. 10, a VSB filter 1001 is coupled to the upper two demodulators 1001 and 1003 for demodulating in quadrature the data from the carrier. The two lower quadrature demodulators 1004 and 1005 respectively are also coupled to the input and although shown on FIG. 10 as separate demodulators as those from 1002 and 1003 may in fact be the same. Two separate demodulatos are shown in FIG. 10, however, for ease of explanation. The input signals for demodulators 1004 and 1005 may be from the input or output of the VSB filter or elsewhere provided that the delays in 1014 and 1015 are adjusted accordingly. The quadrature data signals are processed through two data low pass filters 1006 and 1007 respectively and subsequently through two analog-to-digital converters 1010 and 1011. The two output signals from the analog-to-digital converters are designated $\hat{I}$ and $\hat{Q}$ and are further processed through delay lines 1014 and 1015 respectively so that the phase correction signals used for adjusting any particular pair of data samples have the same delay as the data samples, making use of information which is past, present, and future with respect to the data samples being corrected. $\hat{I}$ and $\hat{Q}$ signals are delayed and then applied to a coordinate transformation module 1016 which is mathematically equivalent to a resolver and rotates the $\hat{I}$ and $\hat{Q}$ signals by the desired angle $\theta$ to obtain the compensated digital in-phase and quadrature signals I and Q. The coordinate transformation module 1016 can be implemented by using a general purpose digital computer such as the Honeywell series 6000 programmed in accordance with the matrix rotation equation (14–1). These compensated signals I and Q, are the same as the signals which would have been obtained if the phase correction $\theta$, could have been applied to the in-phase and quadrature demodulators prior to the time the signals were originally demodulated. Thus, the coordinate transformation compensates for the measured carrier phase error.

The apparatus for determining the carrier phase error angle $\theta$, is shown in the lower half of FIG. 10. The quadrature components of the demodulated carrier signal are applied to carrier low pass filters 1008 and 1009 respectively and are analog signals to these LPF's 1008, 1009. The filtered signals are then applied to analog-to-digital converters 1012 and 1013 which convert these quantities into the digital outputs designated X and Y. Since the beacon is injected in phase with the data, at the transmitter, the data on both sides of the carrier beacon has the same phase angle as the beacon itself, and the data looks like it is an amplitude modulation rather than a phase modulation relative to the carrier beacon. (This is so because as has been explained supra the VSB signal in order to assist in carrier recovery was modified by the insertion of carrier frequency power in phase with the data and by permitting the transmitted spectrum to be approximately double side band in the vicinity of the carrier. See FIG. 3). Hence close to the carrier the data signal looks like a DSB AM signal and not like a VSB or SSB signal. The digital signals X and Y therefore are the amplitude of the recovered carrier beacon in the in-phase and quadrature demodulator channels. The signs of these two outputs X and Y and their ratio are used to compute the carrier phase error angle $\theta$; however, it is not the angle $\theta$ but sine $\theta$ and cosine $\theta$ which are actually needed in the digital resolver 1016. Therefore the computer hardware 1017 computes sine $\theta$ and cosine $\theta$ from X and Y as shown. A general purpose computer can be used to perform this operation. Although in this embodiment the computation is performed digitally, the computation also may be performed in analog fashion or by using a hybrid scheme such as disclosed in the embodiment to be described infra. Given sine $\theta$ and cosine $\theta$ the coordinate transformation technique for performing the phase adjustment is straightforward.

For example, if:

$S_N = \sin\theta$ $C_N = \cos\theta$ and $X_N$ = the $n$th sample of $X(t)$ as defined in equation 15-1

$Y_N$ = the $n$th sample of $Y(t)$ as defined in equation 15-2 then, $R_N = \sqrt{X_N^2 + Y_N^2}$

If moreover, $\epsilon_N$ is defined as:

$$\epsilon_N = R_N^2 - 1$$

then, $K_N = (R_N^2)^{-}1/2 = (1 + \epsilon_N)^{-}1/2$ where $K_N$ is by definition as follows:

$$K_N = 1/\sqrt{X_N^2 + Y_N^2}$$

By the binomial theorem:

$$K_N = 1^{-1/2} + 1^{-3/2}\epsilon^1 \frac{(-\frac{1}{2})}{(1)} + 1^{-5/2}\epsilon^2 \frac{(-\frac{1}{2}\times-\frac{3}{2})}{(1\times2)}$$

$$+ 1^{-7/2}\epsilon^3 \frac{(-\frac{1}{2}\times\frac{3}{2}\times\frac{5}{2})}{(1\times2\times3)}$$

$$+ 1^{-9/2}\epsilon^4 \frac{(-\frac{1}{2}\times-\frac{3}{2}\times-\frac{5}{2}\times-\frac{7}{2})}{(1\times2\times3\times4)} + \ldots$$

$$= 1 - \tfrac{1}{2}\epsilon + \tfrac{3}{8}\epsilon^2 - 15/48\,\epsilon^3 + 105/384\epsilon^4 - 189/786\epsilon^5 + \ldots$$

$$K_N = 1 - \tfrac{1}{2}\epsilon + 3/2\epsilon^2 - 15/16\epsilon^3 + 35/128\epsilon^4 63/256^5 + 231/1024\epsilon^6 - 429/2048\epsilon^7 + \ldots$$

For efficient utilization of available hardware $K_N$ is obtained by the following iterative approximation:

$G_N$ = is an approximation of $K_N$ $\tilde{K}_{N-1}$ = value of $\tilde{K}$ computed for previous phase correction using $X_{N-1}$ and $Y_{N-1}$ $$G_N = [\,3/2 - (K_{N-1}{}^2 R_N^2 12)\,]\,K_N - 1$$

$$\tilde{K}_N = [\,3/2 - (G_N^2 R_N^2/2)\,]\,G_N$$

Where $\tilde{K}_N \doteq 1/\sqrt{X_N^2 + Y_N^2}$

To prevent the algorithm from converging to and tracking an undesired solution as it may for $\tilde{K}_{N-1}$ less than zero or more than plus three a test is inserted in the computer to determine if:

$$\tfrac{1}{2} \le \tilde{K}_N \le 2$$

and the value of $\tilde{K}_N$ set equal to 1 whenever this test fails. An analog AGC system is used to keep K approximately equal to 1 by increasing the VGA gain if $R_N^2$ is less than 1 and decreasing if $R_N^2$ is greater than 1. (See FIG. 11).

The above equation is implemented by the following program steps where:

$X_N$ = the digital value of the Nth sample of the in-phase carrier LPF 1125 output.

$Y_N$ = the digital value of the Nth sample of the quadrature carrier LPF 1124 output.

$\tilde{I}_N$ = the digital value of the Nth sample of the in-phase data LPF 1108 output which is properly delayed by delay line 1113.

$\tilde{Q}_N$ = the digital value of the Nth sample of the quadrature data LPF 1107 output which is properly delayed by delay line 1112.

$$X_N^2 = X_N \cdot X_N \qquad (1)$$

$$Y_N^2 = Y_N \cdot Y_N \qquad (2)$$

$$R_N^2 = X_N^2 + Y_N^2 \qquad (3)$$

$$\tilde{K}_{N-1} = \tilde{K}_{N-1} \cdot \tilde{K}_{N-1} \qquad (4)$$

where $\tilde{K}_{N-1}$ is a previously computed estimate of:

$$1/\sqrt{X_{N-1}^2 + Y_{N-1}^2}$$

Note: $\tilde{K}_{N-1}$ is used as a first approximation for $\tilde{K}_N$ $$E_N = \tilde{K}_{N-1}^2 \cdot R_N^2 \qquad (5)$$

$H_N = E_{N/2}$ accomplished by shifting right one binary place (6)

$$F_N = 3/2 - E_N \qquad (7)$$

$$G_N = \tilde{K}_{N-1} \cdot F_N \qquad (8)$$

Note: $G_N$ is an improved second approximation to $K_N$ $$G_N^2 = G_N \cdot G_N \; (9)$$

$$J_N = G_N^2 \cdot R_N^2 \; (10)$$

$L_N = J_{N/2}$ accomplished by right shifting one binary place (11)

$$M_N = 3/2 - L_N \quad (12)$$

$$\tilde{K}_N = M_N \cdot G_N \quad (13)$$

Note: $\tilde{K}_N$ is the final approximation to $K_N$
Note also that $\tilde{K}_N X_N \doteq \cos\theta_N$
and $\tilde{K}_N Y_N \doteq \sin\theta_N$
The computation of $I_N \doteq \tilde{I}_N \cos\theta_N + \tilde{Q}_N \sin\theta_N$ is performed as follows:

$$I'_N = X_N \cdot \tilde{I}_N \quad (14)$$

$$Q'_N = Y_N \cdot \tilde{Q}_N \quad (15)$$

$$S'_N = I'_N + Q'_N \quad (16)$$

$$I_N = S'_N \cdot \tilde{K}_N \quad (17)$$

Where $I_N$ is the phase jitter compensated output for the in-phase data channel. For this particular application $Q_N$ was not needed.

Figure 11:
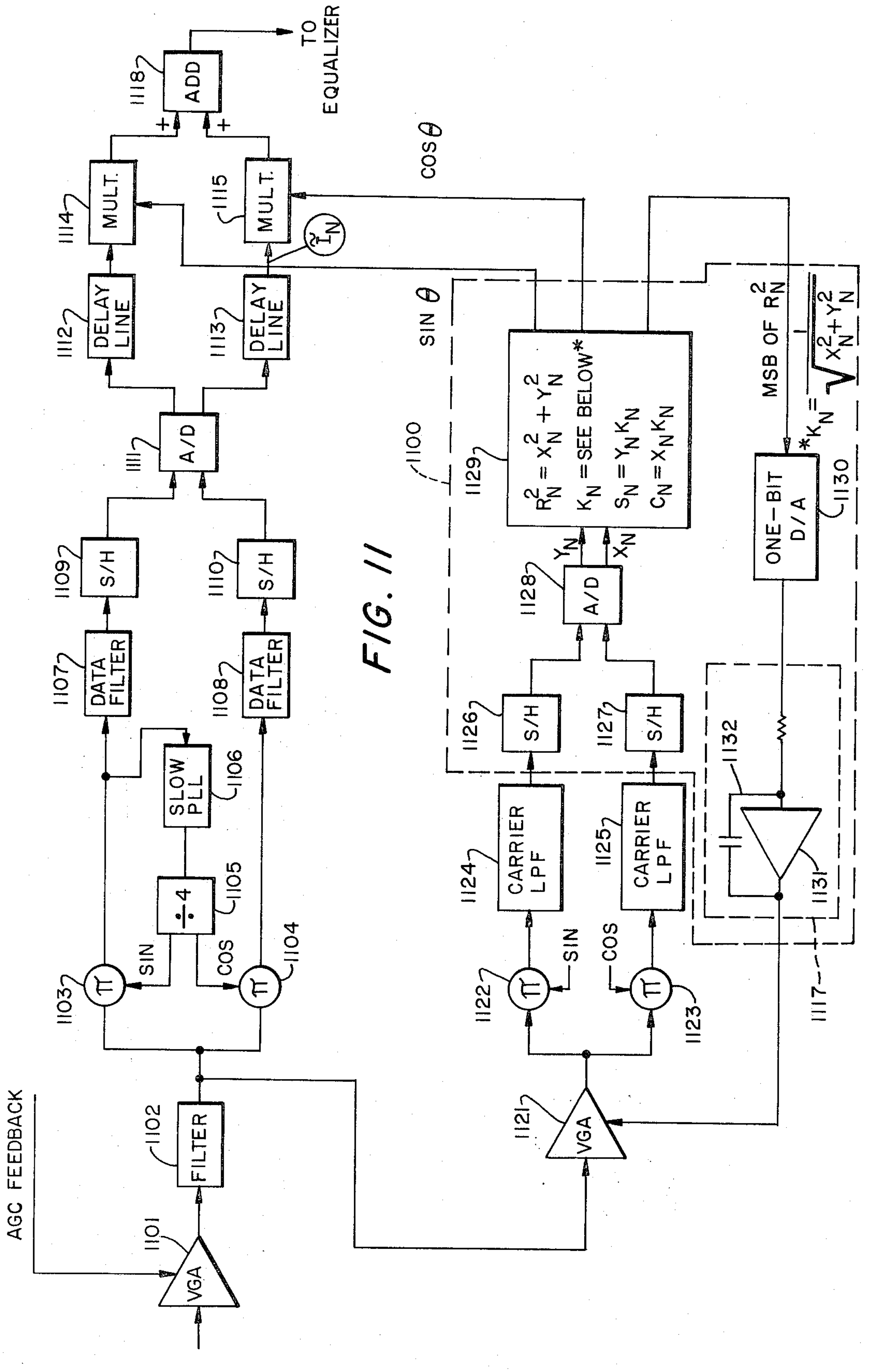
FIG. 11 is a detailed block diagram of a preferred embodiment of the invention.

Referring now to FIG. 11 a variable gain amplifier (VGA) 1101 amplifies the input signal such that it is not amplified too much wherein the saturation condition is not reached, yet not amplified too little wherein noise is a large percentage of the signal. One such VGA is disclosed by the instant inventor in a U.S. Pat. application Ser. No. 201,459 filed 11-23-1971, now U.S. Pat. No. 3,736,520, and assigned to the same assignee as the instant invention. The amplified signal from the VGA 1101, is applied to a vestigial side-band filter (VSB) 1102, which can be of conventional design. (See FIG. 7.10 on page 181 of "Principles of Data Communications" by R. W. Lucky, J. Salz, E. J. Weldon published by McGraw-Hill for typical VSB filter R ($w$).)

The output signal from the VSB 1102 is applied directly or indirectly to four quadrature demodulators 1103, 1104, 1122 and 1123. Demodulators 1103, and 1104 are typically of the switching type. (See application notes of National Semiconductor published in 1970 on "MOS Analog Switches AN-38" for description of switching demodulators.) They shift the passband signal down to a base band signal but give undesired harmonics in the process. Since these demodulators 1103 and 1104 multiply the incoming signal applied at their input terminal by square waves, the harmonics of the square waves generate higher harmonics at the output. These undesired harmonics are conventionally filtered out by data filters 1107 and 1108 respectively. (See L($w$) of FIG. 7.10, page 181 of above-identified book "Principles of Data Communication.") The signals for driving the square wave demodulators 1103 and 1104 are derived from the count-down-by-four circuit 1105, which provides two square waves 90° out of phase. One conventional digital technique for doing this utilizes conventional flip-flops to count down the higher frequency clock signal obtained from a slow phase lock loop 1106. (See "Phaselock Techniques" by Floyd M. Gardner, published 1966 by John Wiley & Sons.) The phase lock loop need not be very accurate or very fast — the only requirement being that it approximate the carrier frequency closely enough so that the errors can be derived by the lower loop circuit — the carrier jitter estimation subsystem — to be described infra. In some applications a fixed crystal oscillator may be used in place of the phase lock loop since the lower loop circuit can compensate for small frequency off-sets.

The output signals of the data filters 1107 and 1108 are sampled at predetermined times at the same baud rate, which is used at the transmitter. (A baud defines the operating speed of transmission and as defined by the "Carrier and Microwave Dictionary" of Lenkurt Electric Company, is the total number of elementary code elements per second.) Since in the 19.2 kilobit per second modem of the instant embodiment each pulse amplitude modulated (PAM) contains four bits, although it could contain another number such as 1, 2 or 3 etc., it is determined by dividing 19.2 by 4 that 4800 independent PAM symbols are transmitted per second. This figure of course is the Nyquist number for a channel of half that bandwidth, i.e., 2,400 Hertz bandwidth. Hence for this embodiment the Nyquist number of pulses for a 2,400 Hertz bandwidth is transferred, each pulse containing four bits of information. The sample and hold circuits 1109 and 1110 take one sample for each baud period, wherein the baud sampling times are obtained from a baud beacon in a conventional manner. The baud output signals are converted to a digital signal by a conventional analog-to-digital A/D converter 1111. The digital signal from the A/D converter 1111 is applied to in-phase and quadrature delay lines 1112 and 1113 respectively to delay the data in-phase and quadrature information signals until the lower loop or carrier jitter estimation subsystem comprised of VGA 1121, in-phase and quadrature demodulators 1122 and 1123, in-phase and quadrature low pass filters (LPF's) 1124 and 1125, and block 1100, can estimate the error in the demodulation angle $\theta$. (The delay lines may be a serial digital shift register or a set of parallel shift registers.) When the phase error has been estimated by the lower loop, the sine and cosine of the error of the angle are supplied from the lower loop to the multipliers 1114 and 1115. The in-phase and quadrature components of the data signals from delay lines 1112 and 1113 respectively are also applied to multipliers 1114 and 1115 respectively, where they are multiplied by the appropriate sine and cosine. The output signals from multipliers 1114 and 1115 are then added in adder 1118 to obtain the dejittered in-phase component. The dejittered signal is then processed in a standard manner using conventional modems.

The lower loop of FIG. 11 which is the carrier jitter estimation subsystem and is comprised of VGA 1121, quadrature demodulators 1122 and 1123, LPF's 1124 and 1125, and block 1100 is used for obtaining an estimate of the error in the carrier phase during the demodulation process. The VGA 1121 provides optimum gain for the input signal. The gain control signal for VGA 1121 is obtained from the output of integrator 1117 which integrates the gain correction from the digital computer 1129. The output signal of VGA 1121 is applied to quadrature demodulators 1122 and 1123 respectively, which are the same type demodulators as used for demodulators 1103 and 1104. The output signals from demodulators 1122 and 1123 are applied to carrier low pass filters LPF's 1124 and 1125 respectively. These LPF's are similar to data filters 1107 and 1108, the difference being that the carrier LPF's 1124 and 1125 have a narrower bandwidth so as to reject a large percentage of the data signals while passing a large percentage of the jittered sidebands around the carrier pilot tone. The output signals of these carrier low pass filters 1124 and 1125 are sampled at sample and hold S/H units 1126 and 1127 at the same clock rate and time as used for driving S/H units 1109 and 1110. The carrier signals from S/H units 1126 and 1127 are applied to analog-to-digital A/D converter 1128 where they are converted to digital signals. (If the digital computer 1129 operates fast enough the A/D converter 1128 may be eliminated and the A/D converter 1111 can be time-shared.) The output signals of $Y_N$ and $X_N$ of A/D converter 1128 are applied to a digital computer 1129 which may be a general purpose computer such as a Honeywell 6,000 type, or a special purpose computer designed to solve the special algorithm previously derived supra. The digital computer computes the sine and cosine of the correction angles in accordance with the algorithm supra and applies these signals to multipliers 1114 and 1115 as previously explained. Moreover, the digital computer also computes $R_N^2$ which is equal to $X_N^2 + Y_N^2$, and this signal is used for controlling the AGC voltage of the VGA 1121 in the carrier jitter estimation sybsystem. $R_N^2$ is computed at each baud time. If $R_N^2$ is greater than one, a signal is applied to integrator 1117 through the one-bit digital-to-analog D/A converter 1130 causing a decrease in VGA gain. If the $R_N^2$ is less than one a signal is applied causing an increase in the VGA gain. However, this feedback loop does not maintain $R_N^2$ exactly equal to one but keeps it close enough so that the computer algorithm previously explained supra can quickly obtain a solution.

Having shown and described a preferred embodiment of the invention, those skilled in the art will realize that many variations and modifications can be made to produce the described invention and still be within the spirit and scope of the claimed invention.

What is claimed is:

1. A method of correcting a phase jitter corrupted communication system having carrier and data signals comprising the steps of estimating a carrier-phase-estimation time delay for demodulation of said data signals from said carrier signals, delaying the data signals by a time equal to the carrier phase estimation time-delay at a point in time where the carrier phase correction is applied, and applying the carrier phase correction to said data signals at said point in time.

2. A method as recited in claim 1 including the step of applying the phase correction at a point in time occurring before demodulation.

3. A method as recited in claim 1 including the step of applying the phase correction at a point in time occurring after demodulation.

4. A method of correcting a phase jitter corrupted carrier system comprised of carrier and data signals comprising the steps of;

a. demodulating in quadrature the data from the carrier;

b. estimating the carrier phase angle correction to be applied in order to correct for phase jitter corruption;

c. delaying the quadrature data signals by an amount equal to the carrier phase-estimation time-delay;

d. correcting the time delayed quadrature data signal by the estimated carrier phase-angle.

5. The method as recited in claim 4 including the step of processing the quadrature data signals through data lowpass filters prior to delaying the data signals.

6. The method as recited in claim 5 including the step of further processing the quadrature data signals through analog to digital converters prior to delaying the data signals.

7. The method as recited in claim 6 including the further steps of processing the quadrature carrier signals through carrier lowpass filters and analog to digital converters.

8. An apparatus for correcting a phase jitter corrupted data communication system:

a. quadrature demodulators for demodulating data signals from carrier signals said demodulated data and carrier signals each having in-phase and quadrature components respectively;

b. carrier-phase-angle error estimating means coupled to said quadrature demodulators for estimating the difference in phase-angle of a modulating carrier relative to a reference carrier that has been corrupted by phase jitter;

c. data signal delay means coupled to said quadrature demodulators for delaying the quadrature demodulated data signals by an amount of time equal to the phase estimation time-delay; and d. correcting means coupled to said data delay means and to said carrier-phase-angle error estimating means, said correcting means for correcting the time-delayed quadrature data signals by the estimated difference in phase angle of the modulating carrier relative to the referencing carrier that has been corrupted by phase jitter.

9. An apparatus as recited in claim 8 including data lowpass filter means coupled to said quadrature demodulators and to said data signal delay means said lowpass filter means for lowpass filtering the data signals.

10. An apparatus as recited in claim 9 including carrier lowpass filter means coupled to said quadrature demodulators and to said carrier-phase-angle error estimating means said carrier lowpass filter means for lowpass filtering the carrier signals.

11. An apparatus as recited in claim 10 further including first analog-to-digital converter means coupled to said data lowpass filter means and to said data signal delay means and second analog-to-digital converter means coupled to said carrier lowpass filter means and to said carrier-phase angle error estimating means said first and second analog-to-digital converter means for converting data and carrier analog signals to digital data and carrier signals respectively.

12. A method for correcting a phase jitter corrupted data communication system comprising the steps of:

a. applying a VSB signal represented by, $$s(t) = g(t) \sin (2 \pi f\mathrm{d}t) + \hat{g}(t) \cos (2 \pi f\mathrm{d}t)$$

to quadrature demodulators;

b. demodulating the VSB signal into in-phase and quadrature components by multiplying the VSB signal by signals representative of the function sin $(2 \pi f\mathrm{d}t + \phi)$ and cos $(2 f\mathrm{d}t + \phi)$ in said quadrature demodulators respectively said in-phase component being represented by, $$I'(t) = s(t) \cdot \sin(2\pi f d t + \phi)$$

c. low pass filtering said in-phase and quadrature components respectively;

d. delaying by a time T said in-phase and quadrature components respectively obtaining in-phase and quadrature signals that are delayed by a time T equal to the time delay for estimating the proper phase for demodulation, such in-phase and quadrature signals represented respectively by, $$\hat{I}(t') = \tfrac{1}{2} g(t') \cos\phi + \tfrac{1}{2} \hat{g}(t') \sin\phi$$

$$\hat{Q}(t') = \tfrac{1}{2} g(t') \sin\phi + \tfrac{1}{2} \hat{g}(t') \cos\phi$$

e. and computing sin $\phi$ and cos $\phi$ respectively where $g(t)$ = the desired base band signal
$\hat{g}(t)$ = the Hilbert transform of $g(t)$
$fd$ = the carrier frequency
$t$ = time
$\phi$ = the phase error of the demodulator
$I'(t)$ = the in-phase demodulator output
$t'$ = the delayed time reference
$\hat{I}(t')$ = the delayed, jitter corrupted, in-phase signal
$T$ = time delay for estimating the proper phase for demodulation
$Q'(t)$ = the quadrature demodulated output
and $\hat{Q}(t)$ = the delayed, jitter corrupted quadrature signal.

13. The method of correcting a phase jitter corrupted communication system as recited in claim 12 including the further step of matrix multiplication to obtain the desired baseband signal $g(t)$ as follows:

$$\begin{bmatrix} \cos\phi - \sin\phi \\ \sin\phi - \cos\phi \end{bmatrix} \begin{bmatrix} \hat{I}(t') \\ \hat{Q}(t') \end{bmatrix} = \begin{bmatrix} \tfrac{1}{2}g(t') \\ \tfrac{1}{2}g(t') \end{bmatrix}$$

14. A method of correcting a phase jitter corrupted communication system having carrier and data signals comprising the steps of estimating a carrier-phase-estimation time delay for demodulation of said data signals from said carrier signals, determining the amount of time required to estimate said carrier-phase-estimation time delay for demodulation of said data signals from said carrier signals, delaying the data signals to be corrected at the point in time where carrier phase correction is applied said data signals being delayed by said determined amount of time required to estimate said proper phase for demodulation, and applying the carrier phase correction to said data signals.

15. A method as recited in claim 14 including the step of applying the phase correction at a point in time occurring before demodulation.

16. A method as recited in claim 14 including the step of applying the phase correction at a point in time occurring after demodulation.

17. A method of correcting a phase jitter corrupted carrier system comprised of carrier and data signals comprising the steps of:

a. demodulating in quadrature the data from the carrier;

b. estimating the carrier phase angle correction to be applied in order to correct for phase jitter corruption;

c. determining the carrier phase-estimation time-delay;

d. delaying the quadrature data signals by an amount equal to the carrier phase-estimation time-delay; and e. correcting the time-delayed quadrature data signals by the estimated carrier phase-angle by performing a coordinate transformation.

18. The method as recited in claim 17 including the step of processing the quadrature data signals through data low pass filters prior to delaying the data signals.

19. The method as recited in claim 18 including the step of further processing the quadrature data signals through analog to digital converters prior to delaying the data signals.

20. The method as recited in claim 19 including the further steps of processing the quadrature carrier signals through carrier low pass filters and analog to digital converters.

21. An apparatus for correcting a phase jitter corrupted data communication system comprising:

a. quadrature demodulators for demodulating data signals from carrier signals said demodulator data and carrier signals each having in-phase and quadrature components respectively;

b. carrier-phase-angle error estimating means coupled to said quadrature demodulators for estimating the difference in phase-angle of a modulating carrier relative to a reference carrier that has been corrupted by phase jitter said carrier-phase-angle error estimating means requiring a time T for performing such estimation;

c. data signal delay means coupled to said quadrature demodulators for delaying the quadrature demodulator data signals by an amount of time equal to the carrier phase estimation time delay T; and d. correcting means coupled to said data delay means and to said carrier phase angle error estimating means, said correcting means for correcting the T-time-delayed quadrature data signals by the estimated difference in phase angle of the modulating carrier relative to the referencing carrier that has been corrupted by phase jitter.

22. An apparatus as recited in claim 21 including data low pass filter means coupled to said quadrature demodulators and to said data signal delay means said low pass filter means for low pass filtering the data signals.

23. An apparatus as recited in claim 22 including carrier low pass filter means coupled to said quadrature demodulators and to said carrier-phase-angle error estimating means said carrier low pass filter means for low pass filtering the carrier signals.

24. An apparatus as recited in claim 23 further including first analog-to-digital converter means coupled to said data low pass filter means and to said data signal delay means and second analog-to-digital converter means coupled to said carrier low pass filter means and to said carrier-phase angle error estimating means said first and second analog-to-digital converter means for converting data and carrier analog signals to digital data and carrier signals respectively.

25. A method of correcting a phase jitter corrupted carrier system comprised of carrier and data signals comprising the steps of:

1. demodulating in quadrature the data from the carrier;
2. estimating during a time period T the carrier phase angle correction to be applied in order to correct for phase jitter corruption said estimation of the carrier phase angle correction further comprising the steps of;

a. applying a pass band signal represented by:

$m(t) = k + g(t) \sin (2 \pi f dt)$ to quadrature demodulators;

b. lowpass filtering the demodulated signals yielding quadrature components represented by, $x(t) = \frac{1}{2} [k + g(t)] \cos \phi$ $Y(t) = \frac{1}{2} [k + g(t)] \sin \phi$ c. calculating the sine and cosine of the demodulation phase error $\phi$ as follows:

$$\cos \phi = X/\sqrt{X^2 + Y^2}$$

$$\sin \phi = Y/\sqrt{X^2 + Y^2} \text{ where}$$

k = additional carrier power due to insertion of a carrier beacon in the transmitter, $t$ = *time*

$g(t)$ = base band data signal $f(t)$ = carrier frequency $X$, and $Y$ = the in-phase and quadrature components respectively $x(t)$ = recovered in-phase carrier beacon $y(t)$ = recovered quadrature carrier beacon and $\phi$ = demodulation phase error;

3. delaying the quadrature data signals by an amount equal to the carrier phase-estimation time-delay T;

d. correcting the T-time-delayed quadrature data signal by the estimated carrier phase-angle.

26. A method of correcting a phase jitter corrupted communication system having carrier and data signals comprising the steps of determining the amount of time T required to estimate a carrier phase angle correction for demodulation of said data signals from said carrier signals, estimating said carrier phase angle correction for demodulation of said data signals from said carrier signals including an allowance for said time T in said estimation and applying said estimation of said carrier phase angle correction to the data to be corrected at a point in time after demodulation.

* * * * *